United States Patent
Bowler et al.

(10) Patent No.: US 8,751,027 B2
(45) Date of Patent: Jun. 10, 2014

(54) AUDIO APPARATUS AND METHOD

(75) Inventors: Antony Keith Bowler, London (GB); Michael Christian Kelly, London (GB); Jason Anthony Page, London (GB)

(73) Assignee: Sony Computer Entertainment Europe Limited (GB)

( * ) Notice: Subject to any disclaimer, the term of this patent is extended or adjusted under 35 U.S.C. 154(b) by 701 days.

(21) Appl. No.: 12/935,076

(22) PCT Filed: Mar. 31, 2009

(86) PCT No.: PCT/GB2009/000849
§ 371 (c)(1),
(2), (4) Date: Nov. 10, 2010

(87) PCT Pub. No.: WO2009/125165
PCT Pub. Date: Oct. 15, 2009

(65) Prior Publication Data
US 2011/0060434 A1    Mar. 10, 2011

(30) Foreign Application Priority Data
Apr. 11, 2008  (EP) .................................. 08251414

(51) Int. Cl.
*G06F 17/00* (2006.01)
(52) U.S. Cl.
USPC .................................. 700/94; 463/30; 463/35
(58) Field of Classification Search
USPC .......................................................... 700/94
See application file for complete search history.

(56) References Cited

U.S. PATENT DOCUMENTS

| | | | | |
|---|---|---|---|---|
| 5,981,860 A * | 11/1999 | Isozaki et al. | .................... | 84/603 |
| 6,226,618 B1 | 5/2001 | Downs et al. | | |
| 6,965,804 B1 * | 11/2005 | Mercs et al. | ..................... | 700/94 |
| 7,454,257 B2 * | 11/2008 | McPherson et al. | ............ | 700/94 |
| 2001/0029540 A1 * | 10/2001 | Ito et al. | ......................... | 709/230 |
| 2002/0045962 A1 * | 4/2002 | Kobayashi | ...................... | 700/94 |
| 2002/0151997 A1 * | 10/2002 | Wilcock et al. | ................. | 700/94 |
| 2007/0291949 A1 * | 12/2007 | Imaki | .............................. | 381/17 |
| 2009/0177538 A1 * | 7/2009 | Brewer et al. | ................... | 705/14 |
| 2011/0153043 A1 * | 6/2011 | Ojala | .............................. | 700/94 |

FOREIGN PATENT DOCUMENTS

| | | |
|---|---|---|
| EP | 1139213 A2 | 10/2001 |
| EP | 1780952 A1 | 5/2007 |
| WO | 2008/005174 A2 | 1/2008 |

OTHER PUBLICATIONS

International Search Report and Written Opinion, PCT/GB2009/000849, dated Jul. 6, 2009.

* cited by examiner

*Primary Examiner* — Paul McCord
(74) *Attorney, Agent, or Firm* — Lerner, David, Littenberg, Krumholz & Mentlik, LLP

(57) ABSTRACT

A method of audio processing an ensemble of sounds for output to a plurality of audio channels comprises the steps of evaluating an overall level of audio detail generated by the contributing sounds of the ensemble by analyzing metadata associated with respective sounds of the ensemble, the metadata being indicative of the contribution of a respective sound of the ensemble to an overall level of audio detail across the plurality of audio channels, and comparing the overall level of audio detail to a first threshold; and in which if the overall level of audio detail exceeds the first threshold, altering the ensemble of sounds to reduce the indicated contribution of the ensemble to the overall level of audio detail.

18 Claims, 4 Drawing Sheets

AUDIO APPARATUS AND METHOD

CROSS REFERENCE TO RELATED APPLICATIONS

Figure 1:
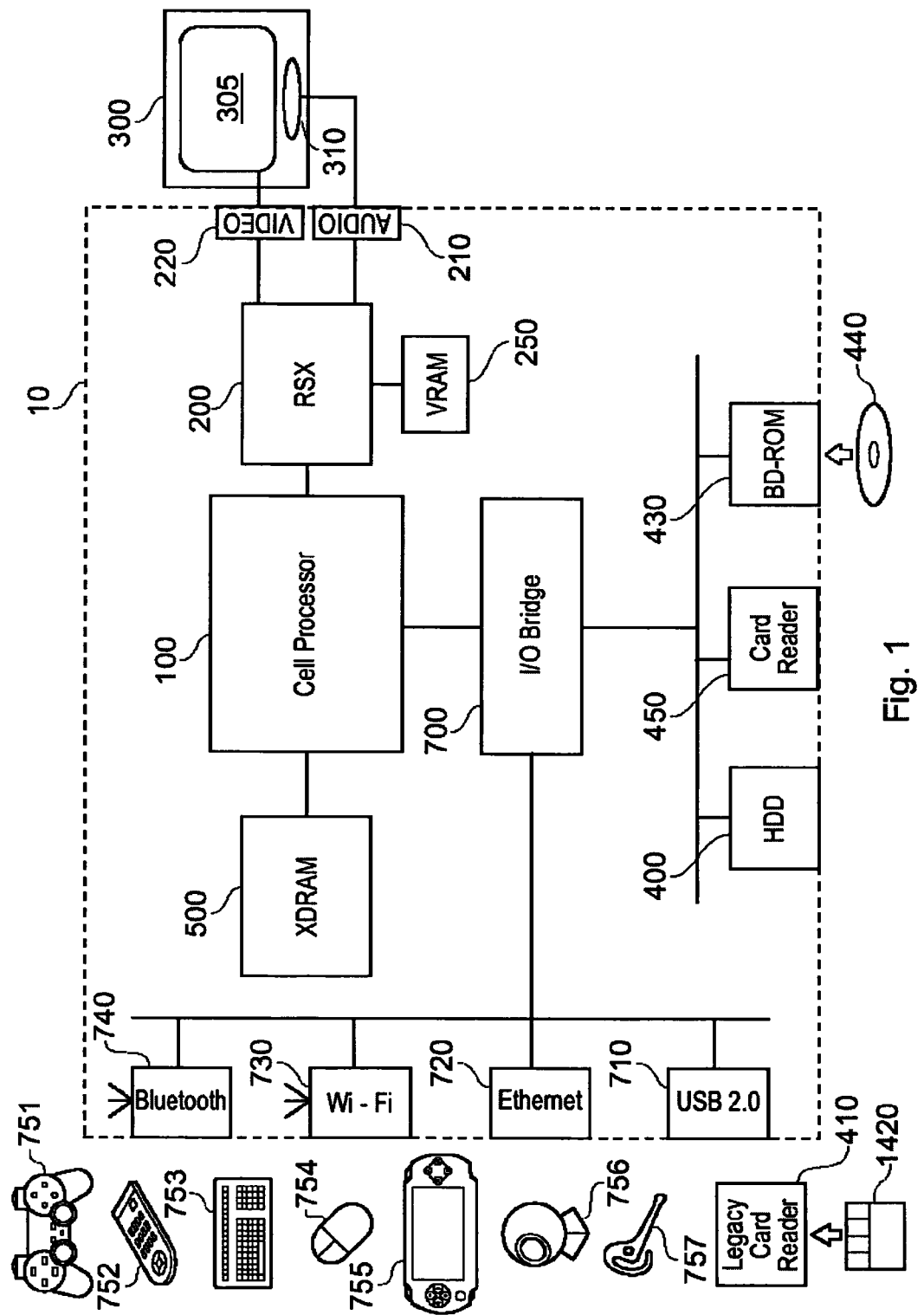

The present application is a national phase entry under 35 U.S.C. §371 of International Application No. PCT/GB2009/000849, filed Mar. 31, 2009, published in English, which claims the benefit of EP Patent Application No. 08251414.2, filed Apr. 11, 2008. The entire disclosures of each of the above-identified applications are incorporated by reference herein.

The present invention relates to an audio apparatus and method.

Traditional audio systems, for example within video game entertainment systems such as the Sony® Playstation 2® entertainment device, have in the order of 48 audio channels through which different sounds can be played.

However, during complex scenes within a game, more than 48 sounds (typically referred to as 'voices') may be potentially relevant. For example, sixteen different enemies, each with footfalls, gunshots and shouts, can account for 48 audio channels even before any ambient sounds, vehicle sounds or sounds associated with a main character or characters are considered.

Consequently it has traditionally become necessary to prioritise the playback of such voices so as to limit the number used in order to match the number which the entertainment device can handle. Conventional rules for the prioritisation of voices include dropping the oldest (longest played) voice, or the quietest voice, or the voice associated with the most distant entity in the game environment, or if none of the above are deemed applicable, conversely not playing a new voice.

To address this restriction, the Sony® Playstation 3 (PS3®) entertainment device can provide a significantly larger number of channels. For example, the so-called MultiStream Engine (audio software for the PS3) provides 512 audio channels. As a result, the need to prioritise the playback of voices is effectively removed except in the most extreme of cases.

However, a new problem is now recognised; the playback of hundreds of separate voices can result in cacophony and confusion for the listener.

In the prior art, emphasis can be given to one voice at the cost of another by the use of so-called 'ducker compression' or cross-limiting, in which an increase in the volume of one voice is used to reduce the volume of another (See http://www.harmony-central.com/Effects/Articles/Compression/). An example of ducker compression in use is when a disc jockey (DJ) speaks over a record, and the music volume drops to aid comprehension of the DJ.

However, applying such an approach to 512 channels (e.g. having a first bank of 256 channels set to cross-limit corresponding channels in a second 256 channel bank) is relatively inflexible, does not necessarily address the problem of cacophonous sound and indeed may even increase confusion for the listener.

Embodiments of the present invention consequently seek to alleviate or mitigate the above problem.

In a first aspect of the present invention, a method of audio processing an ensemble of sounds for output to a plurality of audio channels, the method comprises evaluating an overall level of audio detail generated by the contributing sounds of the ensemble, by analysing metadata associated with respective sounds of the ensemble, the metadata being indicative of the contribution of a respective sound of the ensemble to an overall level of audio detail across the plurality of audio channels; and comparing the overall level of audio detail to a first threshold, and if the overall level of audio detail exceeds the first threshold, altering the ensemble of sounds to reduce the indicated contribution of the ensemble to the overall level of audio detail.

In another aspect of the present invention, an entertainment device comprises an audio processor operable to output an ensemble of sounds over a plurality of audio channels, a data processor operable to analyse metadata associated with respective sounds of the ensemble, the metadata being indicative of the contribution of the respective sound of the ensemble to an overall level of audio detail across the audio channels; the data processor being operable to evaluate the overall level of audio detail generated by the contributing sounds of the ensemble based upon said analysis, comparator means to compare the overall level of audio detail with a first threshold, and if the overall level of audio detail exceeds the first threshold, the data processor is operable to alter the ensemble of sounds to reduce the indicated contribution of the ensemble to the overall level of audio detail.

Thus advantageously by providing numerical information about the contribution of sounds to the overall complexity of the current overall sound output, it becomes possible to evaluate suitable changes to the overall sound output when it becomes so complex that it sounds cacophonous to the user.

Further respective aspects and features of the invention are defined in the appended claims.

Figure 2:
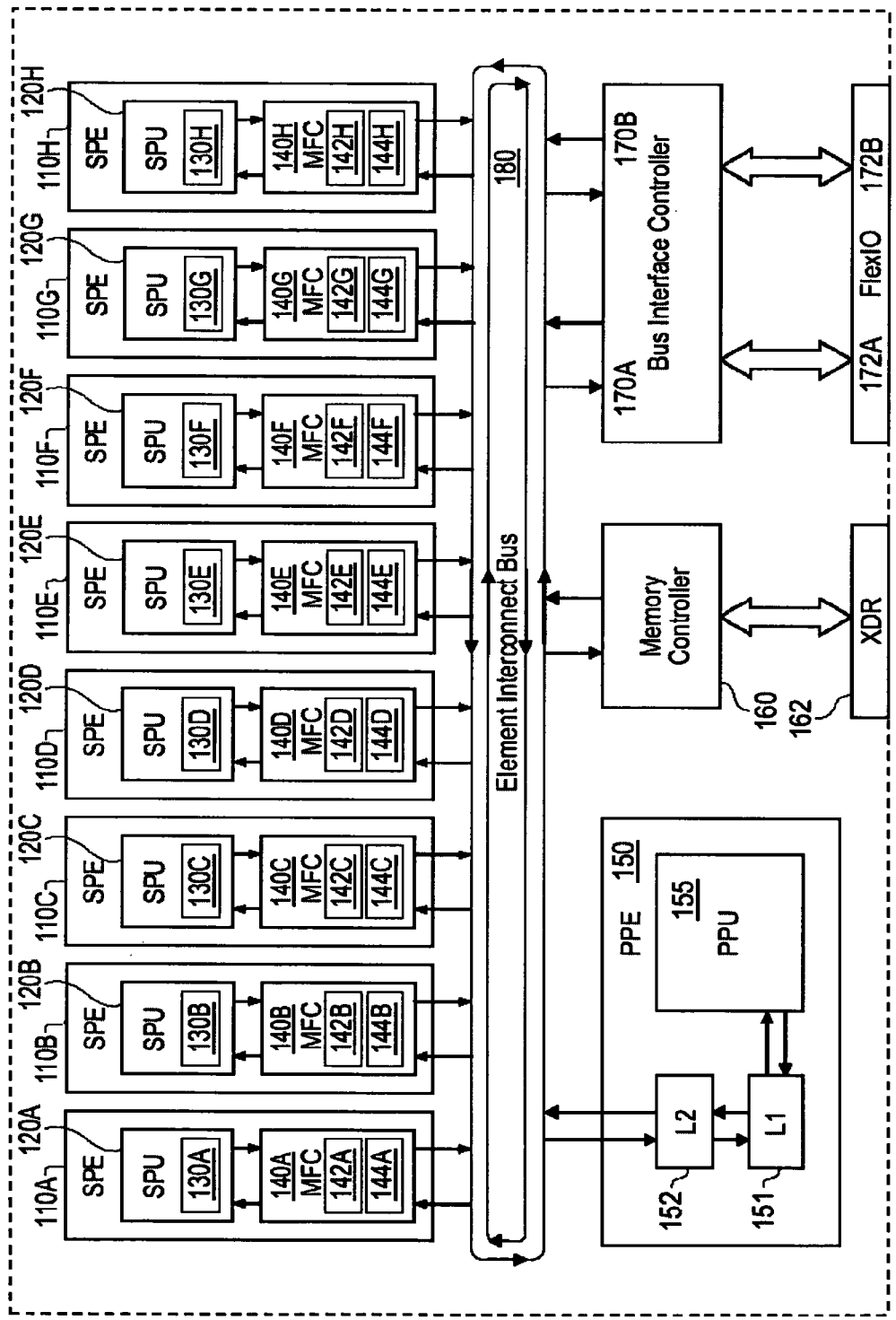
Figure 3:
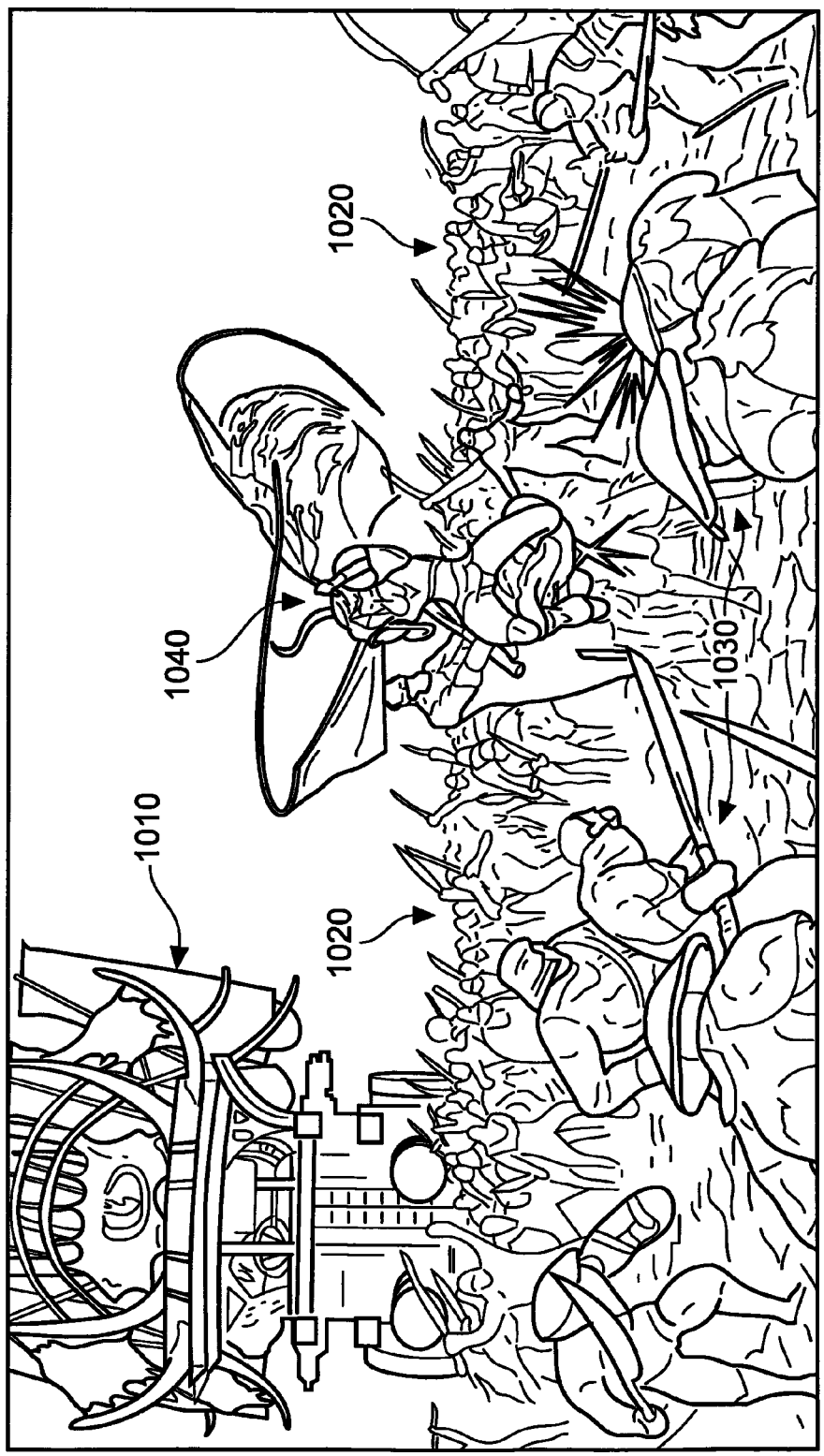
Figure 4:
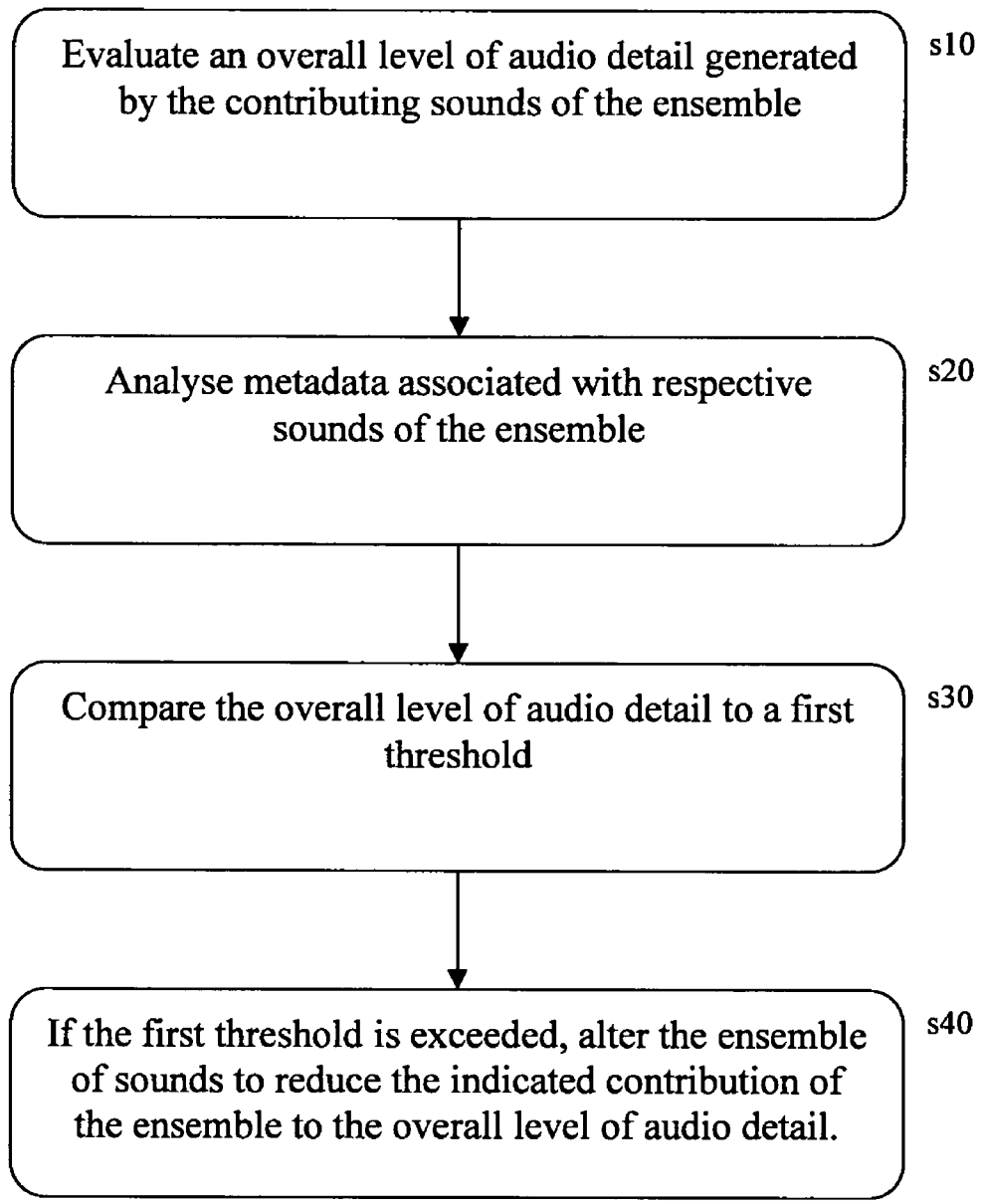

Embodiments of the present invention will now be described by way of example with reference to the accompanying drawings, in which:

FIG. 1 is a schematic diagram of an entertainment device;
FIG. 2 is a schematic diagram of a cell processor;
FIG. 3 is a line drawing of a screenshot from the game Heavenly Sword®;
FIG. 4 is a flow diagram of a method of audio processing in accordance with an embodiment of the present invention.

An audio apparatus and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example embodiment of the present invention, voices are associated with metadata describing such features as the type of voice, the importance of the voice, and/or its distinctiveness. This metadata is used to determine the contribution of a voice to the overall level of audio detail presented to the listener across all open channels. If the overall level of detail exceeds a predetermined threshold, the result is considered cacophonous. In this event, two or more voices of similar type are selected, and are replaced with a single amalgamated voice having a lower level of contribution.

For example, the onset of rain within a game environment may begin with individual rain drops landing, and with ever more rain drops being added. However, several hundred recordings of a rain drop will exceed the overall detail level, and a cross-fade to a recording of rain is performed, resulting in a much lower contribution to the overall level of audio detail.

In another example, in a notional racing game each car has for example up to 16 different voices associated with it, relating to tyre noise on respective surfaces, exhaust noises, engine noises, gear/clutch noises, braking noises, a horn, damage noises etc. Consequently, when racing against one or two cars the experience is realistic and immersive. However, on the starting grid where there may be 30 other cars, the resulting overall level of detail becomes so high as to be cacophonous. Again, as a result some or all of the voices associated with the engines and exhausts of the cars may be replaced by recordings that combine car engine and exhaust noise as general car noise, significantly reducing the effective level of detail. Once the race has started, the cars pull away from the starting line and spread out of earshot along the course. When this happens, the overall audio detail levels will naturally drop, and so for any cars that subsequently approach the player, the full set of voices associated such cars are faded back in to replace generic sounds with full detail.

In this way, an audio apparatus that is capable of outputting a very large number of sounds in parallel can manage the overall effect that is produced, so as to avoid overwhelming the listener by producing an unpleasant or confusing cacophony. Notably, the reduction of the number of voices is not determined by a limit on memory or channel availability (indeed, in embodiments of the present invention replaced voices may remain in memory and be merely muted on their audio-channel), but upon a consideration of the overall level of audio detail presented to the user.

Referring now to FIGS. 1 and 2, in an embodiment of the present invention, a Sony® Playstation 3® entertainment device comprises the audio apparatus.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks. Consequently in embodiments of the present invention the audio apparatus is the Cell processor 100, configured by suitable software.

Typically, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself It will be appreciated that the term "on-line" does not imply the physical presence of wires, as the term can also apply to wireless connections of various types.

FIG. 3 is a screenshot from the game Heavenly Sword for the PS3 that illustrates a situation in which embodiments of the present invention are applicable. It will be appreciated that a precise reproduction of the screenshot is not necessary to an understanding of the present invention. In the screenshot, the lead character (controlled by the user) 1040 is at the centre of a large battle with over 100 opponents. Nearby opponents 1030 are interacting with the lead character, whilst more distant opponents 1020 form a crowd rushing toward the lead character. In due course, some or all of these distant characters will draw near and interact with the lead character, so becoming nearby opponents in turn. Meanwhile a siege engine 1010 remains in the distance and reaching it may, for example, be the current goal for the lead character. In modern games where individual computer controlled opponents typically have some autonomy within the game environment, it will be appreciated that unscripted events such as that shown in FIG. 3 frequently occur, and whilst they provide variety and replayability for the user, the complexity of the scene and in particular the associated sounds may rapidly overwhelm the user.

It will be appreciated that a large number of sounds may be associated with a scene such as that shown in FIG. 3. For example, each opponent may have a battle cry, sword clash and footstep sound associated with them, accounting for around 300 audio channels (i.e. around 100 opponents with 3 sounds each). Nearby opponents may have additional sounds associated with the additional actions and interactions they exhibit when in close proximity to the main character. The main character herself will have a broad repertoire of sounds, many of which may be reproduced simultaneously (e.g. foot steps, cries, weapon sounds and sounds of the character or her weapons otherwise interacting with the environment or other characters). Finally ambient or background sounds, such as weather effects, birds, waterfalls or, in the case of FIG. 3, the movements of the siege engine will also be present.

In an embodiment of the present invention, each sound, or voice, is associated with metadata describing one or more qualities of that particular sound. Such qualities may include:
  i. the importance of the sound within the game (e.g. a sound associated with the main character is likely to be more important that one associated with an ambient effect, such as birdsong);
  ii. the type of sound (e.g. is it primarily noise, like fan noise or wind, or is it tonal like a musical instrument or sword clash, or is it vocal like a cry or word?);
  iii. the distinctiveness of the sound (e.g. is the sound unique or one of a series such as a set of alternative footstep sounds, or opponent cries, or impact sounds);
  iv. Spectral characteristics of the sound (e.g. does it occupy a narrow spectrum, e.g. as a low rumble or high shriek, or is it broadly spread over a wide range?)

Other qualities will be apparent to a person skilled in the art.

Some or all of this metadata may be combined to generate a value indicating the contribution of the sound to the overall level of audio detail accompanying the scene. The totality sounds being played may be referred to as a 'soundscape', and the overall level of audio detail accompanying the scene of FIG. 3 is thus the level of detail of the associated soundscape.

As an example—and using arbitrary and non-limiting values—an ambient fan noise or water noise is categorised as a noise type having a detail value of 10 points. The fan or water noise has an importance value of 10 points, and has a wide spectral envelope that is equated with a value of 10 points, resulting in a total detail score of 30 points. By contrast, a cry by the main character is categorised as a vocal type having a value of 30 detail points and an importance value of 50 points, and has a narrow, high-peaked spectral envelope that is equated with a value of 30 points, resulting in a total detail score for the cry of 110 points.

These values are assigned by the game developer at the creation of the game. The values are stored as metadata, and in an embodiment of the present invention are associated with a particular sound by use of a common file name. For example a sound may be stored as 'soundone.wav' and the associated metadata as 'soundone.dat'.

The metadata file comprises data values corresponding to the values assigned by the game developer for each of the sounds qualities used.

Thus for example if 'soundone.wav' was the cry of the main character described above, then 'soundone.dat' would comprise the value sequence 30, 50, 30, expressed either as alphanumeric text or as byte values.

Alternatively or in addition, metadata for a plurality of sounds is stored in one or more files and is addressed by a look-up table.

Alternatively or in addition sounds may be stored in a format that permits user data fields as part of the sound file. In this case, some or all of the respective metadata can be stored in such user data fields.

In an embodiment of the present invention, these scores are then scaled either up or down according to the level of gain (i.e. volume) at which they are going to be output—the gain itself typically correlating with the distance of the corresponding in-game entity from the user's current viewpoint. Optionally, such scaling may be just downward, if the gain level is below a threshold.

Each of the above listed qualities of sound is now considered in detail.

The importance of a sound is generally intrinsic to the game. For example, a sound associated with the main character is intrinsically more important than one associated with an ambient sound effect. An importance value is then included in the metadata accordingly.

The importance of a sound is incorporated into the score of audio detail primarily for cognitive and psychoacoustic reasons; the user will attend more closely to important sounds within the game and hence the apparent detail they convey within the overall sound is greater than if the same sound was irrelevant to what the player of the game was currently focussing on. Meanwhile, by attending to more important sounds a user will attend less to other sounds, making them more likely to be perceived as uncoordinated and hence cacophonous.

Thus, the overall audio detail level can be equated with a level of perceptual burden upon the player, which is skewed by how the player focuses their attention. Therefore the importance value of the sound reflects the fact that the effective audio detail level is at least partly a function of the player's perceptions and attention.

Consequently, therefore, the importance of a sound may also be contextual within a game. For example, the sounds of an opponent that is fighting the main character are more important than the sounds of an otherwise identical opponent not currently fighting the main character. Likewise an ambient fan noise may become more important if a fan is actually visible on-screen, and wind noise may become more important if there is snow visibly affected on-screen by wind. In these cases, in an embodiment of the present invention the importance value of a sound may be further weighted by the PS3 in response to the context of the game.

The type of sound may be an enumerated list of categories, and may include generic categories such as 'noise', 'gunshots', or 'shouts', but may include more specific categories such as 'shouts by opponent type 6' or 'enemy machine-gun sounds'. Each type has a detail contribution value associated with it.

Optionally, an additional type list may be provided that associates different sounds according to a common source; for example, 'sounds for opponent type 6'. This type list is optionally used for evaluating the sounds in the soundscape, as described later, and does not have detail values associated with it.

The distinctiveness of the sound is an indication of how interchangeable the sound is within the available palette of sounds provided by the game. For example if 20 different footsteps on gravel/road/woodland surfaces are available then each is of a low distinctiveness, even if the variety thereby provided gives a (perhaps subconscious) sense of immersion to the user. By contrast, if there are only two different footsteps on metal surfaces, then each is of a higher distinctiveness than the 20 other footstep sounds as they are not easily replaceable with any of the other 20 footstep sounds.

The spectral characteristic of the sound (expressed for example as an 8-bin spectral histogram taken over the duration of the sound recording, typically normalised to give values out of 100 or some other fixed limit) gives an indication of whether the sound is likely to be noticeable within a particular frequency band at the point of playback. A single detail value can be generated from the spectral characteristic of a sound by comparing a normalised version of its spectral histogram with a normalised version of the total histogram of the soundscape; the detail value will increase where a histogram bin value is comparatively higher than the normalised total and decrease or optionally remain unaltered where it is comparatively lower.

Thus if a game developer chooses to use all the above descriptors, the metadata associated with a sound may resemble the right hand side of the following table (using arbitrary, non-limiting values):

TABLE 1

| Example Metadata | |
|---|---|
| Importance | 30 |
| Type (sound) | 5 |
| Type (source) | 9 |
| Distinctiveness | 10 |
| Normalised | 5 |
| Spectrum (%) | 30 |
| | 70 |
| | 50 |
| | 40 |
| | 20 |
| | 10 |
| | 5 |

It will be appreciated however that for many sounds there will be a strong correlation between sound type and spectral characteristic, and to a lesser extent a correlation between these and distinctiveness and importance. Consequently in principle several of these values could be replaced by a single value and potentially all these metadata values could be replaced by a single 'detail' value for a sound, if the context of the game and the current sound spectrum are not considered.

It will also be appreciated that whilst some or all of the metadata will typically be pre-computed and stored in a form as described above, in principle sufficient metadata may be generated as required by analysis of the sounds to be played, and optionally the game context. For example, the normalised spectrum can be evaluated as required, whilst the sound type can be determined from file structures and/or the in-game entities with which they are associated. Importance can similarly be associated with volume, distance to the user viewpoint, the type of entity with which the sound is associated and whether that entity is visible on screen and/or interacting with the user's character (if not the user's character itself).

Referring again to FIG. 3, and again using arbitrary and non-limiting example values for the sound qualities, for the purpose of explanation it is assumed that the overall audio detail level for the soundscape of the exemplary scene in FIG. 3 is 5,000 points.

A breakdown of the overall detail level gives the following contributions:

| | |
|---|---|
| 100 distant opponents, each scoring 30 points | 3000 pts |
| 5 wind ambient sounds, each 30 points | 150 pts |
| 5 animal ambient sounds, each 30 points | 150 pts |
| 5 siege engine wheel/ground sounds, each 30 pts | 150 pts |
| 5 siege engine sail/fire sounds, each 30 pts | 150 pts |
| 10 close opponents, each scoring 60 detail points | 600 pts |
| 5 main character sounds, each scoring 160 points | 800 pts |
| Total | 5000 pts |

This total detail value is compared with a predetermined threshold above which the audio detail level is considered too high.

Again for the purpose of explanation, it will be assumed here that the predetermined threshold level is 3,000 points and consequently the overall audio detail level of 5000 points is too high, placing an unreasonable burden on the player's perceptions and resulting in cacophony.

In an embodiment of the present invention, the Cell processor, under suitable instruction from software, evaluates the current sounds making the above listed contributions to determine which sounds may be substituted by a single equivalent sound, giving a lower net contribution to overall detail.

To achieve this, sounds may be ranked for substitution selection according to any or all of the following criteria:
  i. How low a sound's detail value is;
  ii. How low a sound's distinctiveness value is;
  iii. How low a sound's importance value is;
  iv. How low a sound's spectral characteristic is;
  v. The position of the sound's type within a rank order of sound types;
  vi. The distance of an associated entity (the virtual sound source) from the player's viewpoint.
  vii. How many other sounds of the same type are playing;
  viii. How many entities with which a sound is associated are currently in the virtual environment, and by extension how many other different sounds a sound is associated with;

Criteria i-vi will generally ascribe a high rank to sounds that have a low contribution to the overall level of detail. Such sounds are ranked high because they tend to be only marginally distinguishable by the user and hence may be substituted with less distraction to the user.

Criteria vii-viii determine whether a sound exists in sufficient quantities to have a significant cumulative effect on the soundscape, and conversely will have a significant reductive effect if substituted.

These rankings may be reviewed periodically (for example once per second, but for different games very different frequencies may be suitable), and/or are reviewed in response to an event, such as an entity whose corresponding sounds are represented by a group sound coming within a threshold distance of the lead character or the user's point of view within the virtual environment, or when the user goes through a door or other threshold within the virtual environment, or when additional or replacement elements of the environment are loaded into memory.

In the present example, the sounds of the distant opponents have equal lowest point scores and are also the most numerous. Consequently these sounds are ranked first for substitution, as in this case criteria vii-viii and criteria i-vi reinforce each other to promote these sounds within the rankings.

For the purposes of example, the individual sounds of 10 distant opponents, each having a detail score of 30 points, may be substituted by a single sound of a group of 10 opponents charging that has a detail score of 100 points. Thus whilst this single sound is relatively detailed (containing, for example an ongoing vocal roar and some occasional sword clashes) and has a score of 100 detail points, the total contribution to the overall detail level of 10 groups of 10 opponents is only one third that of the contribution of the sounds of footsteps, cries and sword clashes from the 100 individual opponents.

As a result of this substitution, the 100 opponents generate 10 instances of this group sound, contributing a total of 1000 points to the overall detail level instead of 3000 individually. As a result, the overall level of audio detail drops to 3000 and is deemed acceptable with respect to the detail threshold level. The group sounds can still be localised within the virtual environment according to where the corresponding groups of opponents are, thereby controlling volume and optionally placement within a surround-sound environment in accordance with the virtual locations of the opponents within the game environment. More generally, group sounds are processed to approximate the spatial characteristics of the sounds they replace within the surround-sound environment, typically by being located at the average position of the replaced sounds. Likewise, any other digital signal processing applied to the original sounds (such as a low-pass filter to generate an underwater effect) would be applied to the corresponding replacement group sound.

It will be appreciated that the threshold at which substitution is triggered may be different to the preferred target level of audio detail; for example, the threshold may be 500 points higher than the preferred level, thereby enabling sound designers to generate exciting and stimulating soundscapes at a challenging level without frequently triggering substitution.

By way of a further example based upon the scene of FIG. 4, and assuming a slightly different set of metadata, then only the footsteps and cries of the distant opponents (accounting for 25 of their 30 detail points) are identified as being of similar types, resulting in substitution of these sounds for 10 opponents with a slightly simpler generic group sound having 75 detail points, but leaving the individual opponent's weapon noises present with a contribution of 5 detail points each.

The resulting contribution level is 100*5+10*75=1250.

Consequently the overall detail level is 3250, i.e. still too high.

The sounds ranked next for substitution are the ambient sounds of wind and animals and the sounds of the siege engine.

In an embodiment of the present invention, these sounds are substituted for respective single sounds having lower overall detail contributions, thereby reducing the overall detail level to 3000 or less in the manner described above.

However alternatively or, in addition, further psychoacoustic effects may be exploited to reduce the apparent detail level of these sounds.

In the case of ambient sounds such as wind or birdsong, where a specific source of the sound is not visible, the volume of the sound can be reduced. As noted above, the detail level of a sound may be scaled by its volume (potentially down to zero if the sound is muted). Consequently, and more generally, the contribution of sounds corresponding to virtual sources not visible in the users viewpoint, and in particular not corresponding to a particular entity within the virtual environment, may have their detail contributions reduced by reducing their volume.

In the case of background sounds related to an entity within the environment, the perceived importance of the sound can be reduced by filtering the frequency spectrum of the sound to reduce its bass level. Thus, for example, the low-frequency rumble of the siege engine sounds may be reduced, so that whilst the sounds associated with the siege engine are still present, their apparent importance is reduced. Consequently the user is not distracted by the sudden absence or quieting of the siege engine sounds, but by being filtered they will place less demand on the user's attention. Such filtering or volume changes may be ramped over a transition period of, for example, one or two seconds.

It will be appreciated that other suitable filtering or processing of a sound to reduce its psychoacoustic impact upon the listener are considered. For example, for a voice the relative amplitude may be reduced in the 200 Hz-2 kHz range.

In this way, a combination of substitution, volume control and filtering may be used as applicable to alter the complexity (as indicated by the contribution values) of sound associated with a scene such as that of FIG. 3, so as to make the associated soundscape stimulating without being overwhelming in detail.

It will be appreciated that one may only substitute two or more sounds for an equivalent group sound if such a group sound (or other suitable single equivalent sound) is provided with the game. Consequently if only a limited number of group sounds are provided, then in an embodiment of the present invention if the total audio detail level exceeds the predetermined threshold, the sounds ranked for substitution will be limited to those for which a substitute group sound is available. In an embodiment of the present invention, such sounds for which group equivalents exist are identified by a flag within their metadata, or by some other form of indicative metadata such as being stored in a particular directory within the PS3 hard drive.

Consequently, in an embodiment of the present invention the metadata and substitution scheme are simplified in view of the limited availability of substitute group sounds. This embodiment assumes that the sound designers of a game will only provide group sounds for those cases where they consider substitution acceptable in use. Consequently the metadata associated with a sound may be simplified to comprise a single detail contribution value and a value indicating whether a substitute group sound is available. The intrinsic importance of a sound is factored into its detail contribution value.

The overall detail level contributed by the current sounds is computed as before, but if it exceeds the predetermined threshold then the sounds ranked for possible substitution will be limited to those for which a specific substitute sound is available.

It will be appreciated that those sounds for which a group substitute is not available may still optionally be selected for volume or frequency modification as described above.

Whilst the intrinsic importance of a sound is factored into its detail contribution value, optionally the contextual importance of such a sound may still be included by weighting the detail contribution value in a manner similar to that described previously, according to whether for example the associated in-game entity is visible within the scene, or is interacting with the main character in some fashion.

Similarly, metadata concerning the spectral characteristics of a sound may optionally still be included either as described above or as a flag identifying a sound as particularly suitable for high-pass (or some other pre-set) frequency filtering.

Alternatively or in addition, substitution can be triggered independently of an overall level of audio detail. For example, if more than a threshold number of parallel instances of a sound are being played, or more than a threshold number of similar entities that use the same sound set are present in the game environment, then substitution for group sounds may be used. In some cases, this will improve the overall realism of the game. To return to a previous example, playback of 200 raindrops may well be below the threshold for overall detail levels, but a recording of actual rain may sound better. In an environment such as a forest or abandoned town (both common in-game environments) where the user will have varying coverage from rain as they move, the system may segue from individual raindrops to recordings of rain and back again as the number of raindrops—as a function of density of cover— varies.

Similarly, the overall level of contribution need not refer to the sum totality of channels being output, but instead grouping could occur in response to overall levels of contribution within sets of sound channels—for example one set related to the player and several sets related to non-player sound effects (for example cars, weapons, environment). In this embodiment, the grouping can help to maintain a balance between contributions from different sets of sounds. Similarly, one or more sets of channels may be excluded from the grouping scheme altogether, such as for example channels outputting the musical score. Thus more generally the techniques disclosed herein can be applied to any ensemble of sounds, an ensemble being a two or more up to the totality of output sounds.

It will be appreciated that where multiple sets of sound channels are considered in this fashion, a sound designer can choreograph their respective levels of contribution, either within a fixed overall level or within a varying overall level.

It will be appreciated that whilst typically a plurality of sounds will be replaced by a single group sound, potentially a plurality of sounds may be replaced by a smaller plurality of group sounds. For example, in a car with perhaps 30 sounds for tyres, engine, gearbox, brakes, and exhaust, rather than substituting the all the separate engine noises for one engine noise, etc., the 30 sounds may instead be replaced by, for example, three sounds representing low frequency engine and tyre/road rumble, mid-range engine/exhaust noise, and high frequency brake/clutch noise. As with the case of a single group sound, here the three sounds, when taken together, have an aggregate contribution score that is less than the original 30 sounds.

In the above embodiments, substitution is achieved by cross-fading the plurality of substituted sounds with the replacement group sound. Thus over a period of for example one second, the volume of the plurality of substituted sounds is reduced to zero whilst the volume of the replacement group sound is increased, whilst keeping the overall volume roughly unchanged.

Optionally, the effect of an additional sound or plurality of sounds can be evaluated prior to their actual use. In this case it is of course possible that they are substituted for a group equivalent before they are ever played, in which case cross-fading is unnecessary.

Likewise, in the above embodiments, optionally there is a minimum time period after substitution for a group sound before the substitution can be reversed (i.e. a group sound is replaced with the original individual sounds). This is useful when the overall audio detail level is fluctuating around the detail threshold level to prevent too many substitutions, which may be distracting to the user. Alternatively, a second detail threshold for reversing substitution may be provided that is lower than that for the original substitution, thereby providing a form of hysteresis in the substitution scheme.

As noted above, the substitution of sounds for group sounds may be reversed, replacing the group sounds with individual sounds. Referring again to FIG. 3, this may happen as a group of distant opponents finally reaches the lead character, and so become nearby opponents that may individually interact with the lead character. In this case, their individual importance (and volume) increases their respective detail contribution scores, and so they are moved down the substitution rankings. Alternatively or in addition, substitution may be reversed because the sound designer has adjusted the overall level of contribution for a particular scene or event in the game and/or for a particular set of sounds relevant to the group sound, as noted above.

In an embodiment of the present invention, some or all of the individual audio channels used by the individual distant opponents are retained for use by the corresponding individual sounds even after substitution occurs; for example, the sounds are simply muted or playback is suspended for the duration of substitution. As a result when the substitution is reversed, the individual sounds are still available in memory and their audio channels are still assigned.

Conversely, group sounds may be further substituted for meta-group sounds. For example, if the lead character runs away from the battle depicted in FIG. 3, the group sounds each corresponding to 10 opponents may themselves be substituted for a single group sound representing 100 opponents as these recede into the distance. In this case, should the user change their mind and re-join the battle, two successive reverse substitutions may occur as opponents again approach the lead character.

Notwithstanding that a grouping strategy optionally might not be applied to channels outputting the musical score of a game, it will be appreciated that embodiments of the present invention can be applied to music as well as sound effects using the same principles. For example, a plurality of violins may be replaced by a recording of an orchestral strings section, or similarly choral voices may be replaced by a group recording.

It will be appreciated that the values used in the above examples are arbitrary and non-limiting. It will also be appreciated that the provision of 512 channels is not an essential requirement, and that more or fewer channels may be available in embodiments of the invention. In the case of few channels, it will be appreciated that embodiments of the invention can prioritise the use of a limited number of sound channels by combining sounds into a group sound. In this case the terminating threshold criterion will not be the overall level of detail but instead the number of channels used, potentially in a weighted combination with the overall level of detail.

Thus, in summary, when a sound is retrieved from memory for playback some or all of the associated metadata is also retrieved. The metadata is used to determine how many notional points of detail the sound will contribute to the soundscape when it is played. This may be as simple as taking a detail value provided in the metadata, or may variously include combining some or all of importance, type, distinctiveness, spectral character or other descriptive metadata to generate a detail value. This detail value may be further scaled according to volume or contextual importance within the game at that point.

The overall level of audio detail is calculated from the sum of detail contributions associated with the sounds being played. If this overall level exceeds a threshold, the soundscape is considered cacophonous and steps are taken to reduce the overall complexity of the sound as perceived by the user.

Firstly, based as applicable upon the sound's detail level, degree of repetition over the audio channels, the number of similar sounds within a type that are being played, the number of sounds associated with instances of the same source entity, relative importance of the sound, and the availability of a suitable alternative group sound, the sounds are ranked for possible substitution. A plurality, of sounds typically of a similar type may then be replaced by a single sound typically representing a group sound that has a lower level of audio detail (and a corresponding lower detail score) than the sum of contributions of the sounds being substituted (replaced). Optionally a plurality of sounds may be replaced by a (generally smaller) plurality of sounds that again has a lower sum level of audio detail than the sum of contributions of the sounds being substituted.

Alternatively or in addition, particularly where the volume level of a sound does not correspond to a specific position within the virtual environment of a game (or that position is outside the field of view of the user), the contribution of that sound to the overall level of detail may be reduced by reducing the volume level of that sound. The sound's contribution level, and hence the overall detail level, are adjusted accordingly.

Alternatively or in addition, where a sound has a high level of bass, the apparent contribution of the sound to the overall level of detail may be reduced by filtering the sound to reduce the bass level. More generally such an approach may be to applied to filter a frequency component or band of any sound where that frequency component or band is significantly higher than the corresponding average frequency component or band of the overall soundscape. The sound's contribution level, and hence the overall detail level, are adjusted accordingly.

These steps may be taken, typically in rank order through a list of candidate sounds as described above, until either:
  i. the overall detail level either drops to a predetermined threshold level, or no more candidate sounds are available, or
  ii. the remaining candidate sounds have a sufficiently high importance (or in the absence of an importance value, a sufficiently high detail) that any substitution, volume change or filtration would have an unacceptably high impact on the quality of the soundscape.

In the second case, what impact is unacceptably high is determined for example by a sound importance threshold. Such an importance/detail threshold may be predetermined based on listener evaluations.

If circumstances change, further substitutions may take place, including the substitution of groups sounds for sounds representing even larger groups, or conversely substitutions may be reversed. Circumstances may be reviewed periodically and/or in response to in-game events.

Referring now to FIG. 4, a corresponding method of audio processing an ensemble of sounds for output to a plurality of audio channels comprises:

in a first step, evaluating (s10) an overall level of audio detail generated by the contributing sounds of the ensemble, by;

in a second step, analysing (s20) metadata associated with respective sounds of the ensemble, the metadata being indicative of the contribution of a respective sound of the ensemble to an overall level of audio detail across the plurality of audio channels;

in a third step comparing (s30) the overall level of audio detail to a first threshold;

and if the overall level of audio detail exceeds the first threshold, in a fourth step, altering (s40) the ensemble of sounds to reduce the indicated contribution of the ensemble to the overall level of audio detail.

It will be apparent to a person skilled in the art that variations in the above method corresponding to operation of the various embodiments of the apparatus described above are considered within the scope of the present invention, including but not limited to:

the alteration comprising substituting two or more sounds for one replacement sound having a lower contribution to the overall level of audio detail than the sum of contributions of the sounds being substituted;

the metadata indicating the importance, type, distinctiveness, type, distinctiveness and/or spectral characteristics of the associated sound;

the metadata indicating that a sound belongs to a group of sounds associated with an in-game entity;

the metadata in a simplified embodiment comprising a detail value and where applicable an indication that a groups substitute sound is available;

that the importance of a sound can be weighted according to the current game context;

that substitution selection is responsive to some or all of the metadata and optionally also to volume;

that two or more substituted sounds can in turn be further substituted;

that substitution can be reversed; and that the contribution of a sound to the overall level of detail can be altered by adjusting its volume and/or one or more frequency components.

Finally, it will be appreciated that in embodiments of the present invention the audio apparatus is in fact embodied by the Cell processor 100 of the PS3 10, so adapted by operating under suitable software instruction.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. A method of audio processing an ensemble of stored contributing sounds for output to a plurality of audio channels, each sound having respective associated pre-assigned stored metadata defining at least an importance of that sound within a gaming environment and the contribution of that sound of the ensemble to an overall level of audio detail across the plurality of audio channels, the method comprising the steps of:

retrieving the ensemble of stored sounds and their corresponding metadata for playback;

evaluating an overall level of audio detail generated by the contributing sounds of the ensemble, by analysing the metadata associated with each respective contributing sound of the ensemble;

comparing the overall level of audio detail indicated by the metadata associated with the contributing sounds of the ensemble to a first threshold; and if the overall level of audio detail exceeds the first threshold, altering the ensemble of sounds to reduce the contribution indicated by the metadata associated with the respective contributing sounds of the ensemble to the overall level of audio detail by substituting a plurality of sounds from the ensemble with one or more replacement sounds having a lower aggregate contribution to the overall level of audio detail than the sum of contributions of the sounds being replaced.

2. A method according to claim 1, in which the number of replacement sounds is smaller than the number of sounds being replaced.

3. A method according to claim 1, in which the step of altering the ensemble of sounds comprises:

selecting a sound for replacement in the ensemble responsive to metadata associated with the sound that indicates the availability of a substitute sound.

4. A method according to claim 1, in which the step of altering the ensemble of sounds comprises:

selecting a sound for replacement in the ensemble responsive to metadata associated with the sound that indicates that sound's level of audio detail.

5. A method according to claim 1, in which the step of altering the ensemble of sounds comprises:

selecting a sound for replacement in the ensemble responsive to metadata associated with the sound that indicates one or more selected from the list consisting of:
i. the sound's type;
ii. that the sound relates to a particular entity within a videogame;
iii. the sound's importance;
iv. the sound's distinctiveness;
v. the sound's spectral characteristics; and
vi. the sound's volume.

6. A method according to claim 5, in which a relative importance of a sound is weighted according to a current context within a videogame.

7. A method according to claim 1, in which replaced sounds retain an assigned audio channel, but are not played in preference to a replacement sound.

8. A method according to claim 1, in which the step of substituting comprises cross-fading from the plurality of sounds being replaced to the one or more replacement sounds.

9. A method according to claim 1, in which a sound that previously replaced two or more sounds in the ensemble is itself selected as one of the plurality of sounds for subsequent replacement by a further sound that has a lower contribution to the overall level of audio detail than the sum of the sounds being selected for replacement.

10. A method according to claim 1, comprising the steps of:

determining whether, at any time after a substitution, the overall level of audio detail subsequently falls below a second predetermined threshold; and if so, substituting back the plurality of sounds previously replaced by one or more replacement sounds.

11. A method according to claim 1, in which the step of altering the ensemble of sounds comprises:

reducing the gain of a selected sound; and applying a corresponding reduction to the contribution of the sound to the overall level of audio detail.

12. A method according to claim 1, in which the step of altering the ensemble of sounds comprises:

filtering a selected sound to reduce one or more frequency components; and applying a corresponding reduction to the contribution of the sound to the overall level of audio detail.

13. An entertainment device, comprising:

an audio processor operable to output an ensemble of stored contributing sounds over a plurality of audio channels, each sound having respective associated pre-assigned stored metadata defining at least an importance of that sound within a gaming environment and the contribution of that sound of the ensemble to an overall level of audio detail across the plurality of audio channels;

a data processor operable to retrieve the ensemble of stored sounds and their corresponding metadata for playback and to analyse the metadata associated with each respective contributing sound of the ensemble;

the data processor being operable to evaluate the overall level of audio detail generated by the contributing sounds of the ensemble based upon said analysis;

a comparator to compare the overall level of audio detail indicated by the metadata associated with the contributing sounds of the ensemble with a first threshold; and if the overall level of audio detail exceeds the first threshold, the data processor is operable to alter the ensemble of sounds to reduce the indicated contribution of the ensemble to the overall level of audio detail by substituting a plurality of sounds from the ensemble with one or more replacement sounds having a lower aggregate contribution to the overall level of audio detail than the sum of contributions of the sounds being replaced.

14. An entertainment device according to claim 13, in which the metadata associated with a sound indicates the availability of a replacement sound.

15. An entertainment device according to claim 13, in which the metadata associated with a sound indicates the sound's level of audio detail.

16. An entertainment device according to claim 13, comprising:

a gain controller operable to adjust the gain of a sound and thereby alter the ensemble of sounds; and a contribution adjuster operable to adjust the contribution of the sound to the overall level of audio detail responsive to the adjustment of gain of the sound.

17. An entertainment device according to claim 13, comprising:

a filter operable to adjust the frequency characteristics of a sound and thereby alter the ensemble of sounds; and a contribution adjuster operable to adjust the contribution of the sound to the overall level of audio detail responsive to the adjustment of the frequency characteristics of the sound.

18. A non-transitory computer-readable storage medium on which is stored instructions of a computer program, the instructions, when executed by a processor of a computer, cause the computer to perform a method of audio processing an ensemble of stored contributed sounds for output to a plurality of audio channels, each sound having respective associated pre-assigned stored metadata defining at least an importance of that sound within a gaming environment and the contribution of that sound of the ensemble to an overall level of audio detail across the plurality of audio channels, the method comprising:

retrieving the ensemble of stored sounds and their corresponding metadata for playback;

evaluating an overall level of audio detail generated by the contributing sounds of the ensemble, by analysing the metadata associated with each respective contributing sound of the ensemble;

comparing the overall level of audio detail indicated by the metadata associated with the contributing sounds of the ensemble to a first threshold; and if the overall level of audio detail exceeds the first threshold, altering the ensemble of sounds to reduce the contribution indicated by the metadata associated with the respective contributing sounds of the ensemble to the overall level of audio detail by substituting a plurality of sounds from the ensemble with one or more replacement sounds having a lower aggregate contribution to the overall level of audio detail than the sum of contributions of the sounds being replaced.

* * * * *